United States Patent
Suzuki et al.

(10) Patent No.: US 7,343,810 B2
(45) Date of Patent: Mar. 18, 2008

(54) PRESSURE SENSOR AND MANUFACTURING METHOD THEREFOR

(75) Inventors: Kazushi Suzuki, Osaka (JP); Kazuya Sakai, Osaka (JP); Isamu Kandori, Nukata-gun (JP)

(73) Assignee: JTEKT Corporation, Osaka-shi (JP)

( * ) Notice: Subject to any disclaimer, the term of this patent is extended or adjusted under 35 U.S.C. 154(b) by 85 days.

(21) Appl. No.: 11/342,535

(22) Filed: Jan. 31, 2006

(65) Prior Publication Data

US 2006/0179954 A1     Aug. 17, 2006

(30) Foreign Application Priority Data

Feb. 8, 2005    (JP)   .............................. 2005-031570

(51) Int. Cl.
*G01L 7/00*      (2006.01)
(52) U.S. Cl. ........................ 73/756; 73/715; 73/717; 73/718; 73/720; 73/726
(58) Field of Classification Search ................. 73/756, 73/715, 717, 718, 720, 726
See application file for complete search history.

(56) References Cited

U.S. PATENT DOCUMENTS

| | | | | |
|---|---|---|---|---|
| 4,375,044 A | * | 2/1983 | Ek | .............................. 315/5.38 |
| 4,898,035 A | * | 2/1990 | Yajima et al. | ................. 73/727 |
| 5,277,942 A | * | 1/1994 | Ikegaya et al. | .............. 428/332 |
| 5,621,243 A | * | 4/1997 | Baba et al. | .................. 257/712 |
| 5,709,337 A | | 1/1998 | Moser et al. | |
| 6,453,747 B1 | * | 9/2002 | Weise et al. | ................... 73/715 |
| 7,231,830 B2 | * | 6/2007 | Otsuka et al. | ................ 73/756 |
| 2004/0177695 A1 | * | 9/2004 | Kawamura et al. | ........... 73/706 |
| 2006/0053896 A1 | | 3/2006 | Suzuki | |

FOREIGN PATENT DOCUMENTS

| | | |
|---|---|---|
| EP | 0 354 479 A2 | 2/1990 |
| EP | 0 480 470 A2 | 4/1992 |
| JP | 2004-37318 | 2/2004 |

OTHER PUBLICATIONS

U.S. Appl. No. 11/342,535, filed Jan. 31, 2006, Suzuki, et al.

* cited by examiner

*Primary Examiner*—Edward Lefkowitz
*Assistant Examiner*—Freddie Kirkland, III
(74) *Attorney, Agent, or Firm*—Oblon, Spivak, McClelland, Maier & Neustadt, P.C.

(57) ABSTRACT

A pressure sensor is composed of a pressure housing having a pressure chamber inside and a pressure sensitive element arranged in the pressure chamber, and a joint housing having a fluid passage for leading fluid into the pressure housing, wherein the pressure housing and the joint housing are jointed by brazing with an insulating member interposed at a joint section therebetween. A stress relieving member is interposed at least either between the metal housing and the insulating member or between the joint housing and the insulating member, so that the insulating member can be relieved of a stress which is caused by the braze jointing to act on the insulating member.

7 Claims, 3 Drawing Sheets

PRESSURE SENSOR AND MANUFACTURING METHOD THEREFOR

This application is based on and claims priority under 35 U.S.C. 119 with respect to Japanese Application No. 2005-031570 filed on Feb. 8, 2005, the entire content of which is incorporated herein by reference.

BACKGROUND OF THE INVENTION

1. Field of the Invention

The present invention relates to a pressure sensor and method for manufacturing the same.

2. Discussion of the Related Art

Heretofore, there has been known a pressure sensor which is provided with a pressure housing having a pressure chamber inside and also having a pressure sensitive element (sensor chip) arranged in the pressure chamber, and a joint housing having formed therein a fluid passage for leading fluid serving as a measured object into the inside of the pressure housing. In the pressure sensor of this kind, it is general that the pressure sensitive element is arranged in the pressure chamber partitioned by a diaphragm and that the pressure chamber is filled up with a pressure conveyance medium (silicon oil or the like). Thus, a pressure at which the fluid led into the pressure housing pressures the diaphragm, that is, the pressure of the fluid is conveyed to the sensor chip through the pressure conveyance medium filled up in the pressure chamber.

However, in the foregoing construction, where a potential difference arises between the pressure housing and the pressure sensitive element, dielectric polarization is brought about in the pressure conveyance medium filled in the pressure chamber, whereby the measuring accuracy is liable to be deteriorated. As one for solving the problem, there has been known a pressure sensor wherein a pressure housing and a joint housing are electrically insulated by the interposition of an insulating member therebetween, as described, for example, in Japanese Unexamined, Published Patent Application No. 2004-37318. By taking this construction, it can be realized to prevent the dielectric polarization of the pressure conveyance medium and hence, to perform the pressure measurement accurately.

By the way, it is general that the pressure housing and the joint housing are made of metal material such as stainless steel, brass or the like, and it is usual that brazing with silver solder or the like is used for joining the both members through the insulating member. However, because the pressure housing and the joint housing (both made of metal material) largely differ in thermal expansion coefficient from an insulating member (made of ceramics), a stress attributed to the difference in thermal expansion coefficient is imposed on a joint section therebetween in the course of a high temperature heating step and a subsequent cooling step for the braze jointing. This stress and a residual stress are liable to cause drawbacks such as the breakage of the insulating member or the deterioration of the strength in the jointing.

SUMMARY OF THE INVENTION

Accordingly, it is a primary object of the present invention to provide an improved pressure sensor and method of manufacturing the same capable of securing a high quality jointing state between a pressure housing and a joint housing by the use of a simplified construction.

Briefly, according to the present invention, there is provided an improved pressure sensor, which comprises a pressure housing having a pressure chamber inside and a pressure sensitive element arranged in the pressure chamber; a joint housing having a fluid passage for leading fluid serving as a measured object into the pressure housing and jointed by brazing with the pressure housing; and an insulating member interposed between the pressure housing and the joint housing at a joint section therebetween for electrically insulating the pressure housing from the joint housing. The pressure sensor is further provided with a stress relieving member, which is interposed at least either between the pressure housing and the insulating member or between the joint housing and the insulating member for relieving a stress which is caused by the braze jointing to act on the insulating member.

With this construction, the insulating member can be relieved of the stress which a difference in thermal expansion coefficient between the pressure housing and the joint housing applies to the insulating member in the course of a high temperature heating step and a cooling step for the braze jointing. As a result, problems can be prevented from arising in the break of the insulating member due to the stress and the residual stress or in the deterioration of the strength in the jointing, so that the jointing state between the pressure housing and the joint housing can be ensured at a high quality.

According to the present invention, there is provided an improved manufacturing method for a pressure sensor which is provided with a pressure housing having a pressure chamber inside and a pressure sensitive element arranged in the pressure chamber; and a joint housing having a fluid passage for leading fluid serving as a measured object into the pressure housing and wherein the pressure housing and the joint housing are jointed by brazing through an insulating member interposed therebetween. The manufacturing method comprises the steps of performing the braze jointing with a stress relieving member interposed at least either between the pressure housing and the insulating member or between the joint housing and the insulating member for relieving the stress which is caused by the braze joining to act on the insulating member; and after the braze jointing step, forming in the stress relieving member a communication hole for making the inside of the pressure housing communicate with the fluid passage.

With this construction, since the communication hole for making the inside of the pressure housing communicate with the fluid passage is formed after the braze jointing step, it does not occur that a metal ingredient of a brazing material which volatilizes during the brazing process adheres to the communication hole of the insulating member, and therefore, the insulating capability of the insulating member can be secured reliably.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Hereafter, a pressure sensor in a first embodiment which embodies the present invention will be described with reference to the accompanying drawings.

Figure 1:
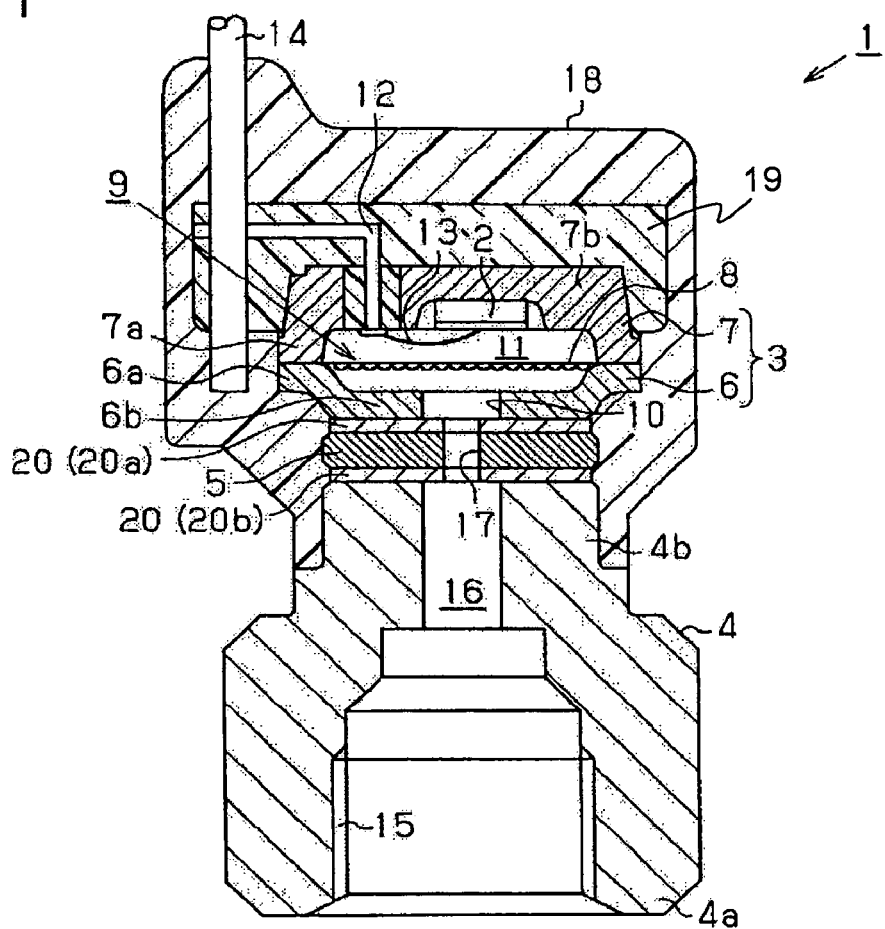
FIG. 1 is a longitudinal sectional view of a pressure sensor in a first embodiment according to the present invention.

As shown in FIG. 1, a pressure sensor 1 in the present embodiment is primarily composed of a pressure housing 3 incorporating a sensor chip 2 as pressure sensitive element therein, a joint housing 4 having formed therein a fluid passage for leading fluid serving as a measured object into the inside of the pressure housing 3, and an insulating member 5 interposed between the pressure housing 3 and the joint housing 4 at a joint section therebetween.

In the present embodiment, the pressure housing 3 is constituted by mutually jointing open ends 6a, 7a of a metal housing 6 and a capsule 7 each taking a dish-like shape and has the inside which is partitioned by a metal diaphragm 8 whose circumferential edge portion is put between the metal housing 6 and the capsule 7. A pressure chamber 9 is defined in a space on the capsule 7 side partitioned by the metal diaphragm 8. In the present embodiment, the circumferential edge portion of the metal diaphragm 8 is jointed by laser welding to the open end 6a of the metal housing 6 as well as to the open end 7a of the capsule 7. Jointing the capsule 7, the metal housing 6 and the metal diaphragm 8 is carried out after jointing the metal housing 6 and the joint housing 4 (as well as the insulating member 5) as referred to later.

In the present embodiment, a through hole 10 for leading the fluid into the pressure housing 3 is formed at the bottom portion 6b of the metal housing 6, and the sensor chip 2 is arranged at the bottom portion 7b of the capsule 7 constituting an upper wall of the pressure chamber 9. The pressure chamber 9 is filled up with silicon oil 11 as pressure conveyance medium. That is, in the present embodiment, the pressure of the fluid led into the pressure housing 3 is conveyed to the sensor chip 2 through the metal diaphragm 8 and the silicon oil 11.

Further, a terminal pin 12 is provided to pass through the bottom portion 7b of the capsule 7 and is connected at its one end to the sensor chip 2 through a bonding wire 13. The other end of the terminal pin 12 is connected to a harness 14. In the present embodiment, a space between the capsule 7 and the terminal pin 12 is sealed by a glass-base sealing member. A resin mold 19 covers a portion of the terminal pin 12 protruding outside the capsule 7 and a connection portion between the terminal pin 12 and the harness 14.

On the other hand, the joint housing 4 is made of a metal material (brass or stainless steel) to take a bottomed cylindrical shape, and a screw or threaded portion 15 is provided on an internal surface adjacent to its open end portion 4a for attaching the joint housing 4 to a pressure measured objective device (not shown). The bottom portion 4b of the joint housing 4 has formed therein a through hole 16 which passes through the bottom portion 4b axially (vertical as viewed in the figure). In the present embodiment, this through hole 16 together with an inside space of the joint housing 4 constitute a fluid passage for leading the fluid serving as measured object into the pressure housing 3.

In the present embodiment, the insulating member 5 is made of alumina-base ceramics, and the pressure housing 3 and the joint housing 4 are jointed by brazing through the insulating member 5 (as being interposed) therebetween. More specifically, the pressure housing 3 and the joint housing 4 are jointed by brazing to the insulating member 5 respectively at the bottom portion 6b of the metal housing 6 thereof and the bottom portion 4b with the through hole 16 constituting the fluid passage. A through hole 17 is formed in the insulating member 5 for communication with the through hole 10 of the metal housing 6 as well as with the through hole 16 of the joint housing 4, that is, for making the inside of the pressure housing 3 communicate with the fluid passage formed in the joint housing 4. In the pressure sensor 1 in the present embodiment, a resin mold 18 covers the whole of the pressure housing 3 and a part of the joint housing 4 inclusive of the joint section therebetween.

Further, in the present embodiment, stress relieving members 20 (20a and 20b) each for relieving a stress which the aforementioned braze jointing causes the insulating member 5 to suffer are interposed respectively between the pressure housing 3 (i.e., the metal housing 6) and the insulating member 5 and between the joint housing 4 and the insulating member 5. Thus, the metal housing 6 and the insulating member 5 are jointed by brazing with each other through the stress relieving member 20a, while the joint housing 4 and the insulating member 5 are jointed by brazing with each other through the stress relieving member 20b.

Figure 2A:
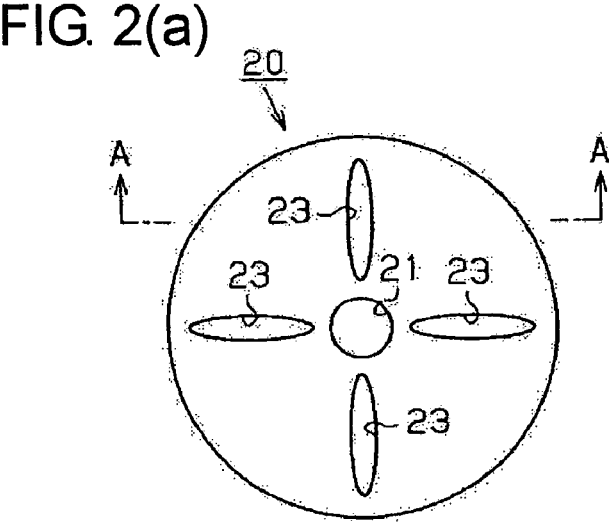
FIG. 2(a) is a top view of a stress relieving member incorporated into the pressure sensor.
Figure 2B:
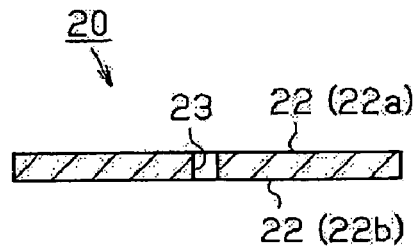
FIG. 2(b) is a cross-sectional view of the stress relieving member taken along the line A-A in FIG. 2(a)

Specifically, in the present embodiment, the stress relieving members 20 are made of a soft metal material or a metal material with a low thermal expansion coefficient. Copper, aluminum base alloy or the like can be used as the soft metal material, and iron-nickel base 42 alloy (Fe-42% Ni), iron-nickel-cobalt base alloy well known as Kovar or the like can be used as the metal material of the low thermal expansion coefficient. Further, as shown in FIGS. 2(a) and 2(b), in the present embodiment, each of the stress relieving members 20 has formed therein a plurality of through holes 23 opening to the opposite joint surfaces 22 (22a, 22b) thereof, in addition to a communication hole 21 which is formed at the center thereof for making the through hole 17 formed in the insulating member 5 communicate with the through hole 10 of the metal housing 6 or with the through hole 16 of the joint housing 4. In the present embodiment, the through holes 23 take the form of elongated holes extending radially of each stress relieving member 20 and are formed at four places circumferentially spaced at approximately 90-degree equiangular interval.

Figure 3:
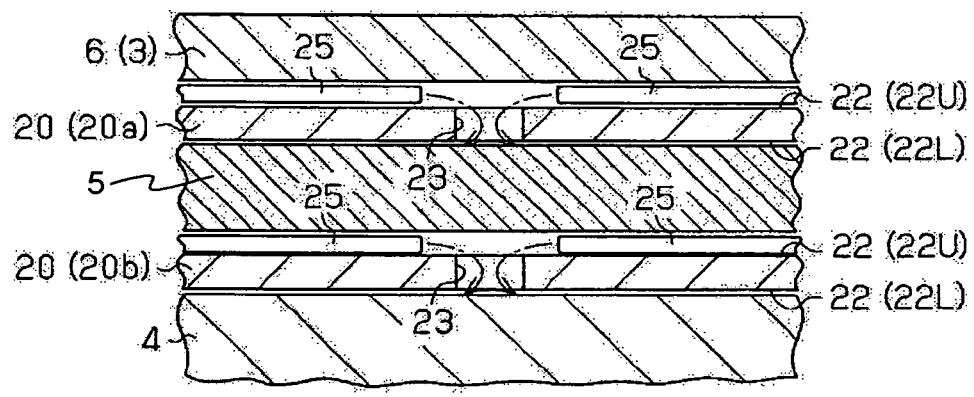
FIG. 3 is an explanatory view for explaining the function of through holes formed in the stress relieving member.

As shown in FIG. 3, in the pressure sensor 1 in the present embodiment, the braze jointing of the pressure housing 3 (i.e., the metal housing 6) and the joint housing 4 (and the insulating member 5 therewith) are carried out with the stress relieving members 20a and 20b interposed respectively between the metal housing 6 and the insulating member 5 as well as between the joint housing 4 and the insulating member 5. One or more pieces of brazing material (e.g., silver braze) 25 in thin plate-like form are placed only on the joint surface 22U on the upper side of the opposite joint surfaces 22 of each of the stress relieving members 20a and 20b.

That is, in the present embodiment, since the through holes 23 are formed in each of the stress relieving members 20, the brazing material 25 melted by a heating process outflows from the joint surface 22U on the upper side through the through holes 23 to the joint surface 22L on the lower side. Therefore, without placing the brazing material 25 on the joint surfaces 22L on the lower side, it can be realized to perform the braze jointing reliably between the stress relieving member 20a, the metal housing 6 and the insulating member 5 as well as between the stress relieving member 20b, the joint housing 4 and the insulating member 5. Although a clearance between every two jointed members in FIG. 3 is illustrated in an exaggerated scale for the purpose of explanation, it is needless to say that such a clearance between every two jointed members is extremely minute in fact.

The following advantages can be accomplished according to the present invention.

(1) The pressure housing 3 (i.e., the metal housing 6) and the joint housing 4 are brazed and jointed through the insulating member 5. The stress relieving members 20 (20a and 20b) each for relieving the stress caused by the aforementioned braze jointing to the insulating member 5 are interposed respectively between the metal housing 6 and the insulating member 5 as well as between the joint housing 4 and the insulating member 5. By taking this construction, it can be realized to relieve the stress which is caused by the difference in thermal expansion coefficient between the pressure housing 3 and the joint housing 4 to act on the insulating member 5 in the course of the high temperature heating process and the cooling process for the braze jointing. As a consequent, a drawback can be prevented from occurring in that the stress and the residual stress cause the insulating member 5 to break or cause the joint strength to be lowered, so that a high quality jointing state can be secured between the pressure housing 3 and the joint housing 4.

(2) Each of the stress relieving members 20 has formed therein the plural through holes 23 which open to the opposite joint surfaces 22 (22a, 22b) thereof. By taking this construction, the brazing material 25 which is placed on the joint surface 22U on the upper side of the opposite joint surfaces 22 of each stress relieving member 20a, 20b is melted by the heating process to outflow to the joint surface 22L on the lower side during the braze jointing between the metal housing 6, the joint housing 4 and the insulating member 5. Therefore, without placing the brazing material 25 on the joint surfaces 22L on the respective lower sides, it can be realized to perform the brazing joint reliably between the stress relieving member 20a, the metal housing 6 and the insulating member 5 as well as between the stress relieving member 20b, the joint housing 4 and the insulating member 5. As a consequence, it can be realized to make the braze jointing process easy as well as to reduce the manufacturing cost through the suppression of the quantity of the brazing material to be used. Further, by the provision of the through holes 23, each stress reliving member 20 becomes easy to deform in the radial directions thereof. As a result, the stress acting on the insulating member 5 can be relieved more effectively. Further, it is possible to make the stress relieving members 20 of a less-expensive material without spoiling the stress relieving function thereof.

Second Embodiment

Hereafter, a pressure sensor in a second embodiment which embodies the present invention will be described with reference to the accompanying drawings. For the convenience of description, the same components as those of the first embodiment are omitted from being repetitively described as being designated by the same reference numerals.

Figure 4:
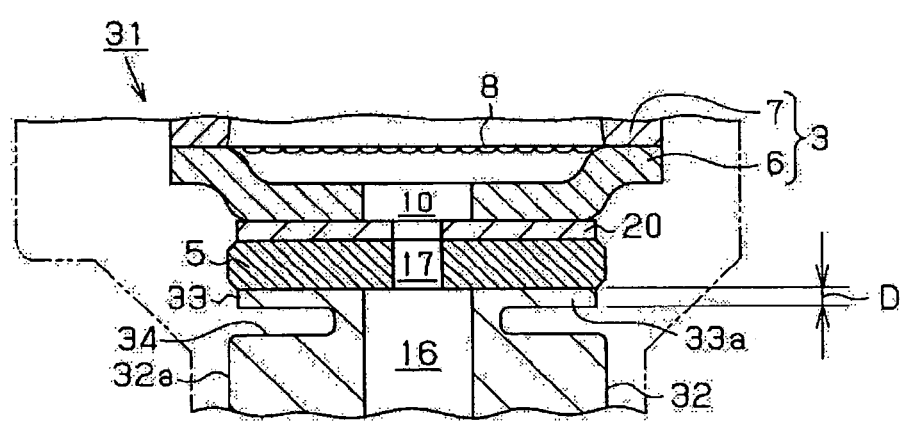
FIG. 4 is a fragmentary longitudinal sectional view of a pressure sensor in a second embodiment according to the present invention.

As shown in FIG. 4, in a pressure sensor 31 in the present embodiment, the joint housing 32 is provided with a recess portion 34 at a portion adjacent to the joint section 33 where the through hole 16 opens, over the whole circumferential length thereof. The insulating member 5 is jointed to the joint portion 33 without interposition of a stress relieving member 20.

That is, in the present embodiment, the joint portion of the joint housing 32 with the insulating member 5, that is, the joint section 33 to which the insulating member 5 is jointed by brazing is formed to take a flange shape by providing the aforementioned recess portion 34. More specifically, the joint section 33 is set to have the depth (D) which enables the flange portion 33a to thermally deform easily. Thus, during the braze jointing, the flange portion 33a can relieve the stress acting on the insulating member 5 by being thermally deformed. Accordingly, by taking this construction, it becomes possible to secure the jointing state of a high quality between the joint housing 32 and the insulating member 5 without interposing therebetween any stress relieving member 20b as used in the foregoing first embodiment. This makes it possible to simplify the braze jointing process as well as to suppress the manufacturing cost.

Other Embodiments or Modifications

Each of the foregoing embodiments may be altered or modified as follows:

In the foregoing first embodiment, the stress relieving members 20 (20a, 20b) are interposed respectively between the pressure housing 3 (i.e., the metal housing 6) and the insulating member 5 and between the joint housing 4 and the insulating member 5. However, the present invention is not limited to such construction. The stress relieving member 20 may be provided either between the metal housing 6 and the insulating member 5 or between the joint housing 4 and the insulating member 5. That is, there may be taken a construction that a single stress relieving member 20 is provided at either one of these two joint sections.

Although in the foregoing second embodiment, the insulating member 5 is jointed with the joint section 33 of the joint housing 32 without interposition of any stress relieving member 20, the same may be interposed therebetween.

Figure 5A:
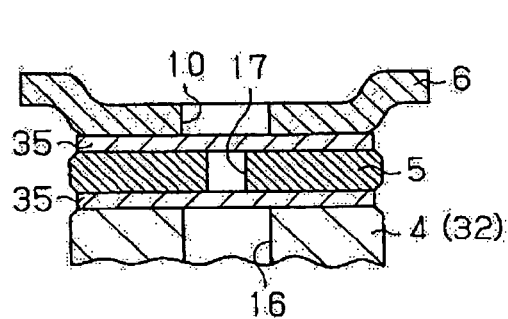
FIG. 5(a) is an explanatory view for explaining a manufacturing method for a pressure sensor in a modified form or a third embodiment according to the present invention.
Figure 5B:
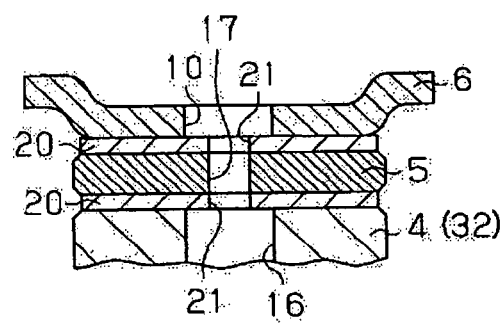
FIG. 5(b) is an explanatory view for explaining the manufacturing method for the pressure sensor shown in FIG. 5(a) and particularly showing a process of forming a communication hole in each of stress relieving members.

Although having been not referred to particularly in each of the foregoing embodiments, the communication hole 21 of the stress relieving member 20 which makes the through hole 17 of the insulating member 5 communicate with the through hole 10 of the metal housing 6 or with the through hole 16 of the joint hosing 4 (32) may be formed after the braze jointing of these members. That is, as shown in FIG. 5(a), the braze jointing of these members are first performed using stress relieving members 35 each not having the communication hole 21 therein. Then, as shown in FIG. 5(*b*), the communication hole 21 is formed on each stress relieving member 35 after the braze jointing.

Figure 6:
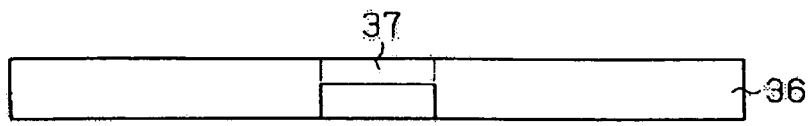
FIG. 6 is a schematic view showing the cross-section of a stress relieving member in another modified form.
Figure 7A:
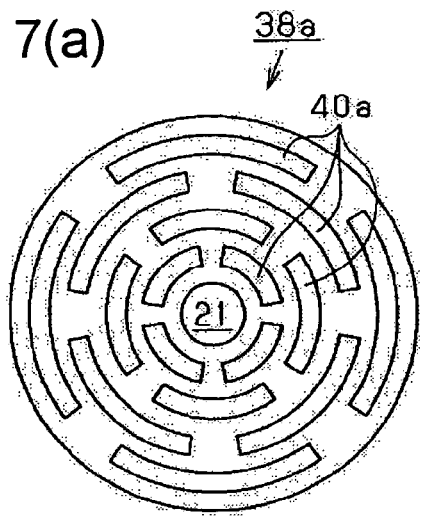
FIGS. 7(a) to 7(d) are top views of stress relieving members in other modified forms.
Figure 7B:
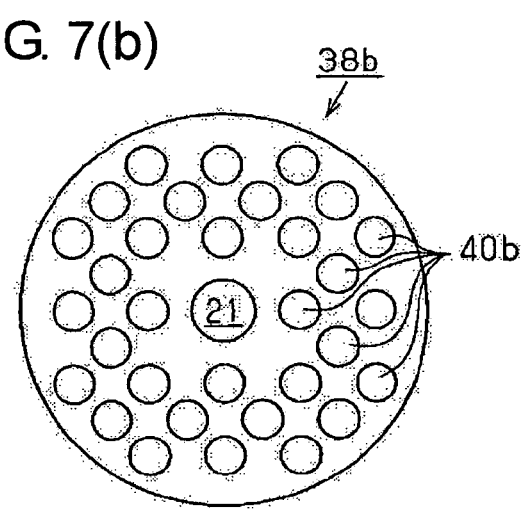
Figure 7C:
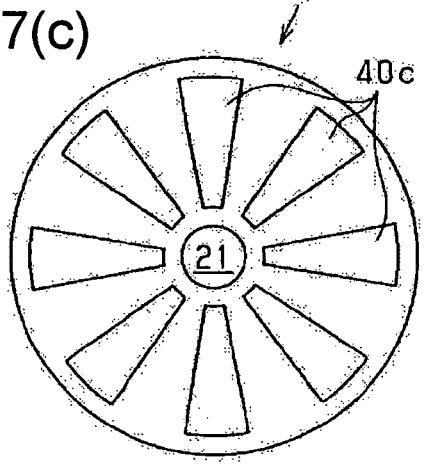
Figure 7D:
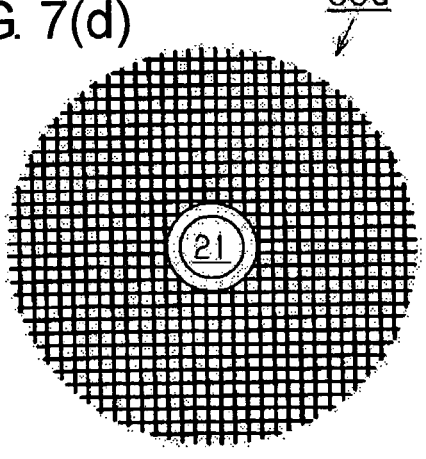

By taking this manufacturing steps, there can be precluded a possibility that at the high temperature heating process (about 800 degrees of centigrade or so) during the braze jointing, metal ingredients of the joint housing 4 volatilize and adhere to the through hole 17 of the insulating member 5 thereby to harm the insulation capability of the same. In particular, since the melting point of zinc (Zn) included in brass is lower than that of silver braze, it is preferable to practice this manufacturing method where the joint housing 4 is made of brass.

Where the method wherein the communication hole 21 is formed after the braze jointing is practiced as mentioned above, there may be used stress relieving members 36 each of which, as shown in FIG. 6, is made to be thin in advance at a portion at which the aforementioned communication hole 21 is to be formed, that is, at a communication hole forming portion 37. By taking this construction, forming the communication hole 21 becomes easier.

Although each of the foregoing embodiments takes the construction that the plural through holes 23 are formed in each of the stress relieving members 20 to open to the opposite joint surfaces of each of the same, a single through hole may be formed in each of the stress relieving members 20. Moreover, there may be taken a construction that any such through hole is not provided in each stress relieving member 20.

In each of the foregoing embodiments, the through holes 23 take elongated holes extending radially of each stress relieving member 20 and are formed at four places circumferentially spaced at approximately 90-degree equiangular interval. The shape, number and arrangement of the through holes formed in each of the stress relieving member 20 are not limited to those described in the embodiments.

For example, there may be taken a configuration that like a stress relieving member 38*a* shown in FIG. 7(*a*), a plurality of arch-like through holes 40*a* are provided each to extend in the circumferential direction and to be formed at multiple stages in the radial direction, or another configuration that like another stress relieving member 38*b* shown in FIG. 7(*b*), through holes 40*b* are arranged in a lattice fashion. In the stress relieving member 38*a* shown in FIG. 7(*a*), the arrangement of the through holes 40*a* at each radial stage may be offset angularly from those at another radial stage next thereto. Further, there may be take a further configuration that like a stress relieving member 38*c* shown in FIG. 7(*c*), sector-form through holes 4*c* each expanding radially outward are arranged at an approximately equiangular interval in the circumferential direction. By taking these configurations, the stress relieving member 38*a* shown in FIG. 7(*a*) is able to properly relieve the stress acting in the radial directions, and the stress relieving member 38*b* shown in FIG. 7(*b*) is able to equally relieve the stress acting on the joint sections. Further, the stress relieving member 38*c* shown in FIG. 7(*c*) is able to properly relieve the stress acting in the circumferential direction.

The stress relieving member may take the form of a mesh-like stress relieving member 38*d* shown in FIG. 7(*d*) by increasing in number the through holes to be made. That is, so far as the through holes are formed as those capable of allowing melted brazing material to pass from the joint surface 22U on the upper side to the joint surface 22L on the lower side, the stress relieving member may be used in the form of that having the through holes in a random arrangement or in the form of itself being porous.

Obviously, numerous further modifications and variations of the present invention are possible in light of the above teachings. It is therefore to be understood that within the scope of the appended claims, the present invention may be practiced otherwise than as specifically described herein.

What is claimed is:

1. A pressure sensor comprising:
    a pressure housing having a pressure chamber inside and a pressure sensitive element arranged in the pressure chamber;
    a joint housing having a fluid passage for leading fluid serving as a measured object into the inside of the pressure housing and jointed by brazing with the pressure housing;
    an insulating member interposed between the pressure housing and the joint housing at a joint section therebetween for electrically insulating the pressure housing from the joint housing; and
    a stress relieving member interposed at least either between the pressure housing and the insulating member or between the joint housing and the insulating member for relieving a stress which is caused by the braze jointing to act on the insulating member,
    wherein the stress relieving member is provided with at least one through hole opening to opposite joint surfaces thereof.

2. The pressure sensor as set forth in claim 1, wherein the stress relieving member is made of a soft metal or an alloy having a low thermal expansion coefficient.

3. A pressure sensor comprising:
    a pressure housing having a pressure chamber inside and a pressure sensitive element arranged in the pressure chamber;
    a joint housing having a fluid passage for leading fluid serving as a measured object into the inside of the pressure housing and jointed by brazing with the pressure housing;
    an insulating member interposed between the pressure housing and the joint housing at a joint section therebetween for electrically insulating the pressure housing from the joint housing; and
    a stress relieving member interposed at least either between the pressure housing and the insulating member or between the joint housing and the insulating member for relieving a stress which is caused by the braze jointing to act on the insulating member,
    wherein the joint section of the joint housing to which the insulating member is jointed by brazing is formed to take a flange shape and wherein the depth of the flange shape portion is made to be thin for relieving the stress.

4. A pressure sensor comprising:
    a pressure housing having a pressure chamber inside and a pressure sensitive element arranged in the pressure chamber;
    a joint housing having a fluid passage for leading fluid serving as a measured object into the inside of the pressure housing and jointed by brazing with the pressure housing;
    an insulating member interposed between the pressure housing and the joint housing at a joint section therebetween for electrically insulating the pressure housing from the joint housing; and
    a stress relieving member interposed at least either between the pressure housing and the insulating member or between the joint housing and the insulating member for relieving a stress which is caused by the braze jointing to act on the insulating member, wherein the stress relieving member has a communication hole for making the inside of the pressure housing communicate with the fluid passage and wherein the communication hole is formed after the braze jointing of the pressure housing with the joint housing.

5. The pressure sensor as set forth in claim 4, wherein the stress relieving member before the braze jointing is made to be thin at a portion thereof at which the communication hole is to be formed after the braze jointing.

6. A manufacturing method for a pressure sensor which is provided with a pressure housing having a pressure chamber inside and a pressure sensitive element arranged in the pressure chamber; and a joint housing having a fluid passage for leading fluid serving as a measured object into the pressure housing and wherein the pressure housing and the joint housing are jointed by brazing through an insulating member interposed therebetween; the manufacturing method comprising the steps of:

performing the braze jointing with a stress relieving member interposed at least either between the pressure housing and the insulating member or between the joint housing and the insulating member for relieving a stress which is caused by the braze jointing to act on the insulating member; and after the braze jointing step, forming in the stress relieving member a communication hole for making the inside of the pressure housing communicate with the fluid passage.

7. The manufacturing method as set forth in claim 6, wherein a plurality of through holes are formed in the stress relieving member each to open to opposite joint surfaces thereof; and wherein the step of performing the braze jointing comprises:

placing a brazing material on a joint surface on the upper side of the stress relieving member; and heating the brazing material to melt and outflow from the joint surface on the upper side to a joint surface of the lower side through the plurality of through holes so that the braze jointing is attained at the joint surfaces on the upper and lower sides of the stress relieving member.

* * * * *